(12) United States Patent
Oak et al.

(10) Patent No.: US 10,355,584 B1
(45) Date of Patent: Jul. 16, 2019

(54) TRANSIENT RESPONSE TECHNIQUES FOR VOLTAGE REGULATORS

(71) Applicant: Empower Semiconductor, Inc., Newark, CA (US)

(72) Inventors: Parag Oak, Sunnyvale, CA (US); David Lidsky, Oakland, CA (US)

(73) Assignee: Empower Semiconductor, Inc., Newark, CA (US)

( * ) Notice: Subject to any disclaimer, the term of this patent is extended or adjusted under 35 U.S.C. 154(b) by 0 days.

(21) Appl. No.: 16/024,404

(22) Filed: Jun. 29, 2018

(51) Int. Cl.
| | |
|---|---|
| G05F 1/46 | (2006.01) |
| H02M 1/32 | (2007.01) |
| H02M 1/088 | (2006.01) |
| H02M 3/158 | (2006.01) |

(52) U.S. Cl.
CPC .............. H02M 1/32 (2013.01); H02M 1/088 (2013.01); H02M 3/158 (2013.01)

(58) Field of Classification Search
CPC . H02M 2001/0003; H02M 2001/0025; H02M 2001/0045; H02M 2001/0032; G05F 1/46; G05F 1/461; G05F 1/462; G05F 1/468
See application file for complete search history.

(56) References Cited

U.S. PATENT DOCUMENTS

| | | | | |
|---|---|---|---|---|
| 5,774,734 A | * | 6/1998 | Kikinis | ............ G05F 1/465 323/282 |
| 9,312,759 B2 | * | 4/2016 | Hsu | .............. H02M 3/156 |

* cited by examiner

*Primary Examiner* — Gary L Laxton
(74) *Attorney, Agent, or Firm* — Kilpatrick Townsend & Stockton LLP

(57) ABSTRACT

A circuit is disclosed. The circuit includes a power supply node and a system configured to receive current from the power supply node at a regulated voltage and to generate one or more control signals indicating an anticipated change in the current. The circuit also includes a voltage regulator configured to provide the current to the power supply node and to drive the power supply node with the regulated voltage, where the value of the regulated voltage is based at least in part on the one or more control signals.

20 Claims, 9 Drawing Sheets

TRANSIENT RESPONSE TECHNIQUES FOR VOLTAGE REGULATORS

FIELD OF THE INVENTION

The present application generally relates to voltage regulators, and more particularly to techniques for improving a transient response of voltage regulators.

BACKGROUND OF THE INVENTION

Voltage regulators are frequently used to provide power to electronic systems, such as cell phones, displays, and other electronic systems. Each electronic system has a specification requirement defining a limited range of tolerable voltage difference from an expected power supply voltage. Because of output impedance and limited bandwidth of voltage regulators, transient loads create circumstances under which maximum and minimum power supply voltages may be violated.

BRIEF SUMMARY OF THE INVENTION

One inventive aspect is a circuit. The circuit includes a power supply node, and a system configured to receive current from the power supply node at a regulated voltage and to generate one or more control signals indicating an anticipated change in the current. The circuit also includes a voltage regulator configured to provide the current to the power supply node and to drive the power supply node with the regulated voltage, where the voltage regulator is configured to change the value of the regulated voltage in response to the one or more control signals.

Another inventive aspect is a method of operating a circuit. The method includes, with a power supply node, providing current at a regulated voltage to a system. The method also includes, with the system, receiving the current, and generating one or more control signals indicating an anticipated change in the current. The method also includes, with a voltage regulator, providing the current to the power supply node, driving the power supply node with the regulated voltage, and changing the value of the regulated voltage in response to the one or more control signals.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1:
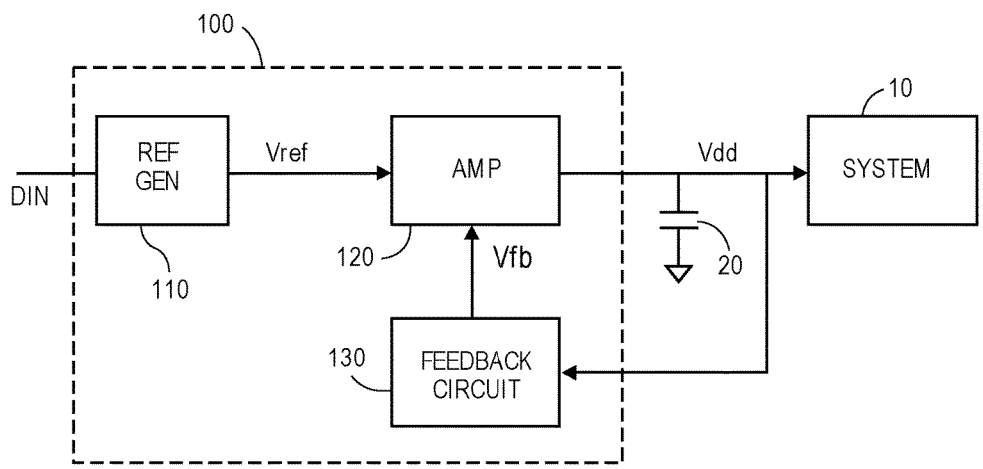
FIG. 1 is a block diagram of a prior art voltage regulator providing a VDD power supply voltage to system.

FIG. 1 is a block diagram of a prior art voltage regulator 100 providing a VDD power supply voltage to system 10. Voltage regulator 100 includes reference generator 110, amplifier 120, and feedback circuit 130.

Reference generator 110 may, for example, include a digital-to-analog converter (DAC), and is configured to generate a reference voltage Vref based on a digital input word DIN.

Amplifier 120 receives the reference voltage Vref and a feedback voltage Vfb, and generates the output supply voltage VDD based on a difference between the reference voltage Vref and the feedback voltage Vfb.

Feedback circuit 130 generates the feedback voltage Vfb based on the output supply voltage VDD.

System 10 functions and operates based on power received from the VDD power supply. Because the operation of system 10 is not static, the current load, or impedance presented to reference generator 110 by system 10 changes. In some circumstances, the change may be dramatic, for example, when a user provides an indication to system 10 that indicates that system 10 should change to an operating mode from a sleep mode.

Because of output impedance and limited bandwidth of voltage regulator 110, the transient load creates circumstances under which maximum and minimum power supply voltage VDD limits may be violated. Bypass capacitor 20 limits voltage excursions on power supply voltage VDD by providing charge to system 10 or receiving charge from voltage regulator 110 during load transients.

Figure 2:
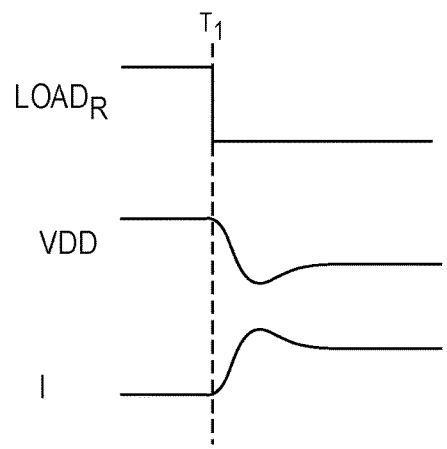
FIG. 2 is a waveform diagram illustrating an example transient response of a voltage regulator.

FIG. 2 is a waveform diagram illustrating an example transient response of voltage regulator 110.

At time T1, a user performs an action with system 10 which causes the impedance of system 10 to reduce. For example, a user of a cell phone may tap a touch display push a button. In response to the user input, the cell phone powers up the display. This results in a sudden increase in current demand, or a decrease in impedance presented to the voltage regulator 110.

In response to the increased current load, or decreased impedance, the voltage at the power supply VDD decreases. In response to the decreased power supply voltage VDD, voltage regulator 110 causes an increase in current to the VDD power supply.

Eventually, the power supply voltage VDD stabilizes to an acceptable value, however, the excursion in the power supply voltage VDD can cause problems for system 10. For example, if the excursion is large enough, system 10 may cease functioning properly. In addition, when the excursion is an increase in voltage, in response to an increased impedance, if the increase is large enough, system 10 may be damaged.

The magnitude and duration of the excursion are related to the magnitude of the change in impedance and the bandwidth of the voltage regulator 110.

Figure 3:
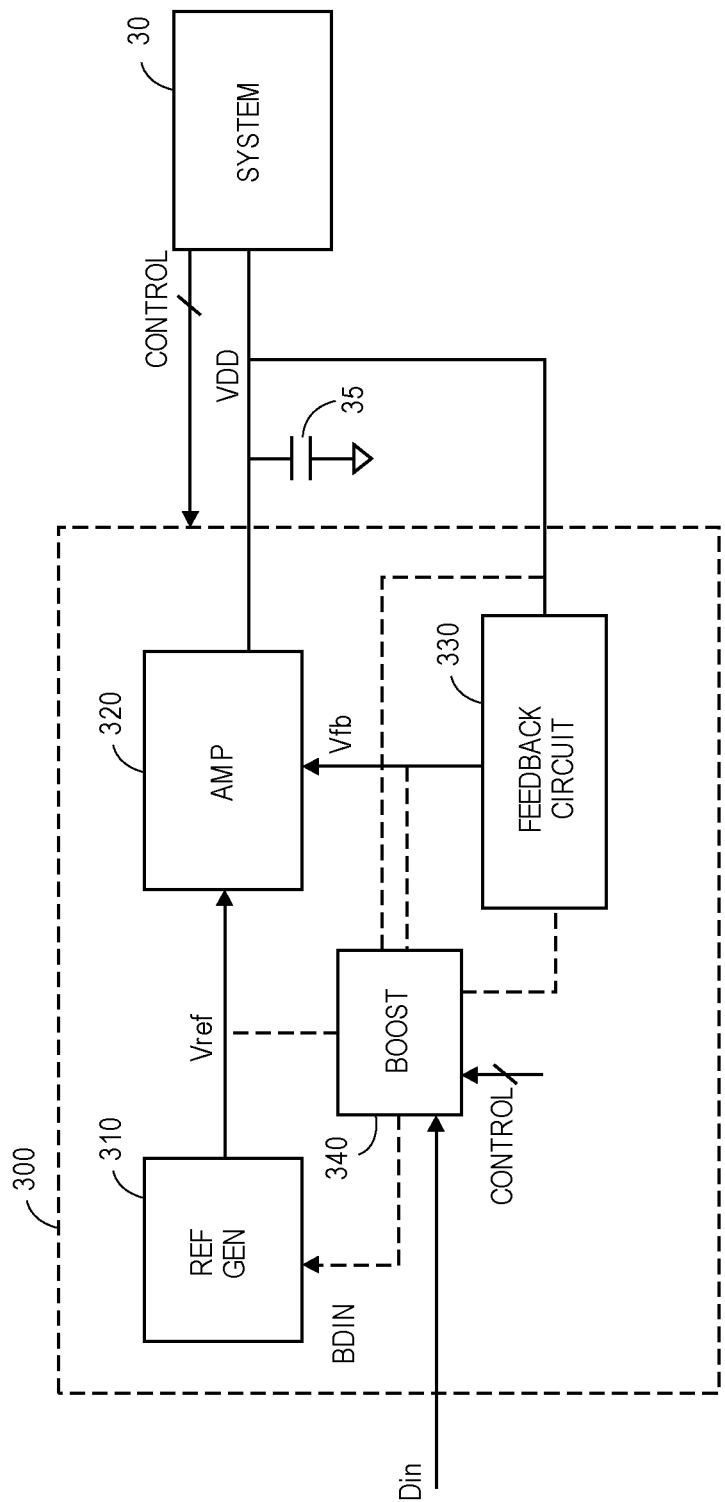
FIG. 3 is a block diagram of a voltage regulator providing a VDD power supply voltage to a system.

FIG. 3 is a block diagram of a voltage regulator 300 providing a VDD power supply voltage to system 30. Voltage regulator 300 includes reference generator 310, amplifier 320, feedback circuit 330, capacitor 35, and boost circuit 340. In some embodiments, voltage regulator 300, capacitor 35, and system 30 are integrated on a single substrate. In some embodiments, the capacitor 35 operates effectively to reduce the magnitude of VDD voltage transients despite being small enough to be integrated because of the preemptive voltage regulator control discussed herein. In some embodiments, the substrate comprises a semiconductor. In alternative embodiments, one or more of the capacitor 35 and the system 30 is on a substrate separate from the substrate of the voltage regulator 300.

Reference generator 310 may, for example, include a digital-to-analog converter (DAC), and is configured to generate a reference voltage Vref based on a digital input word on bus BDIN.

Amplifier 320 receives the reference voltage Vref and a feedback voltage Vfb, and generates the output supply voltage VDD based on a difference between the reference voltage Vref and the feedback voltage Vfb.

Feedback circuit 330 generates the feedback voltage Vfb based on the output supply voltage VDD.

System 30 functions and operates similarly to system 10 of FIG. 1 with regard to transient loads. In addition, capacitor 35 functions and operates similarly to capacitor 20 of FIG. 1. However, voltage regulator 300 has improved response to transient load conditions as compared to system 10 of FIG. 1.

System 30 is configured to respond to various events and inputs which cause a sudden change in impedance or current requirement presented to the VDD power supply. The events and inputs may increase or decrease the impedance presented to the VDD power supply.

In addition, based on the various events and inputs, system 30 is configured to calculate or determine various aspects of the expected change in impedance or current requirement. For example, in some embodiments, system 30 is configured to calculate one or more of: whether the change increases or decreases the current requirement of system 30, a magnitude of the change (for example, as a percentage of a maximum current requirement), a slope of the change with respect to time, an indication of a time when the change is to occur, and an indication of a duration during which the system 30 will operate with the changed current requirement. Other aspects of the change in impedance or current requirement may be additionally or alternatively be determined.

Additionally or alternatively, based on the various events and inputs, system 30 may be configured to calculate or determine various aspects of a preemptive change to induce in the voltage at VDD power supply to mitigate or limit the voltage excursion in the voltage VDD caused by the expected change in current load of system 30. For example, in some embodiments, system 30 is configured to calculate one or more of: whether the preemptive change in the voltage at VDD should be an increase or a decrease in voltage, a magnitude of the preemptive change, a slope of the preemptive change with respect to time, an indication of a time when the preemptive change is to occur, and an indication of a duration during which the system 30 will operate with the preemptive change before returning to its prior operating state. Other aspects of the preemptive change in the VDD supply voltage may be additionally or alternatively be determined. In some embodiments, the various aspects of the preemptive change in the voltage at VDD are determined or calculated based on the determined or calculated aspects of the change in impedance or current requirement of system 30.

For example, if system 30 is for a cell phone and the event is receiving an incoming call, system 30 may be configured to, in response to receiving the incoming call, determine a list of responses the incoming call will generate. System 30 may then use one or more lookup tables to determine a current load and/or any other of the load change aspects associated with each of the responses of the list. Based on the information from the one or more lookup tables, system 30 may calculate or determine one or more additional aspects of the impending current load change. Based on the information from the one or more lookup tables, system 30 may calculate or determine one or more additional aspects of a preemptive change in the voltage at VDD power supply to induce in order to mitigate or limit the voltage excursion in the voltage VDD caused by the expected change in current load of system 30.

Additionally or Alternatively, if system 30 is for a cell phone and the event is receiving an incoming call, system 30 may be configured to, in response to receiving the incoming call, determine a list of responses the incoming call will generate. System 30 may then use one or more lookup tables to determine one or more aspects of a preemptive change in the voltage at VDD power supply to induce to mitigate or limit the voltage excursion in the voltage VDD caused by the expected change in current load of system 30.

Boost circuit 340 is configured to respond to the information received from communication bus CONTROL by causing the voltage VDD to preemptively change to mitigate or limit the voltage excursion in the voltage VDD caused by the change in current load of system 30.

In some embodiments, boost circuit 340 is configured to calculate or determine various aspects of a preemptive change to induce in the voltage at VDD power supply to mitigate or limit the voltage excursion in the voltage VDD caused by the expected change in current load of system 30, where the aspects of the preemptive change are calculated or determined based on aspects of the expected change in impedance or current requirement received from communication bus CONTROL from system 30.

Alternatively, boost circuit 340 may be configured to cause the voltage VDD to preemptively change based on aspects of the preemptive change in the voltage VDD received from communication bus CONTROL from system 30.

For example, if system 30 is for a cell phone and the event is an expected turning off of the display as a consequence of the cell phone receiving no input for a time period, system 30 uses a lookup table to determine a magnitude of a decrease in current load to be presented to the VDD power supply when the display turns off, and any other aspects of the change in current load resulting from the event. Additionally or alternatively, system 30 may determine one or more aspects of a preemptive change in the voltage at VDD power supply to induce to mitigate or limit the voltage excursion in the voltage VDD caused by the expected change in current load of system 30. System 30 communicates the magnitude of the decrease and the other aspects of the expected current load change or the aspects of a preemptive change in the voltage at VDD power supply to the voltage regulator 300 using communication bus CONTROL. Boost circuit 340 is configured to respond to the information received from communication bus CONTROL by causing the voltage VDD to preemptively change to mitigate or limit the voltage excursion in the voltage VDD caused by the change in current load of system 30, where various characteristics of the preemptive change in the voltage VDD are determined based on the information received from communication bus CONTROL.

In some embodiments, the duration of the effect of boost circuit 340 on the preemptive VDD voltage increase or decrease is based on information received on communication bus CONTROL from system 30. For example, in some embodiments, the duration of the effect of boost circuit 340 on the preemptive VDD voltage increase or decrease may be about 1 ns, 5 ns, 10 ns, 20 ns, or 50 ns. In some embodiments, the time profile of the VDD voltage increase or decrease is controlled by boost circuit 340 based on information received on communication bus CONTROL from system 30, for example to match an expected profile of the anticipated change in current load of system 30.

As indicated by the multiple dashed electrical connections from boost to various other nodes in voltage regulator 300, there are various potential mechanisms for boost circuit 340 to preemptively change the voltage VDD. Accordingly, there are various embodiments of boost circuit 340, some of which are discussed further below.

Figure 4:
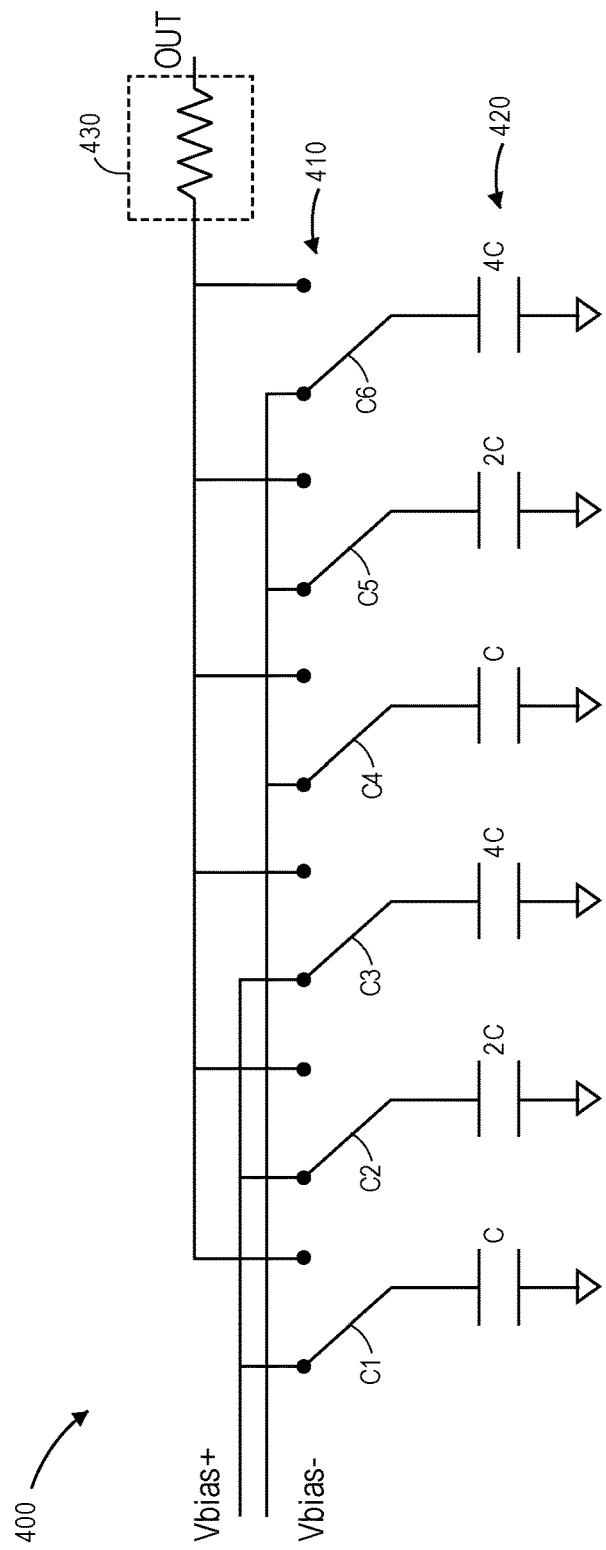
FIG. 4 is a schematic illustration of an embodiment of a boost circuit.

FIG. 4 is a schematic illustration of an embodiment of a boost circuit 400, which may be used as boost circuit 340 in voltage regulator 300 of FIG. 3.

Boost circuit 400 includes a plurality of switches 410 each connected with a respective one of a plurality of capacitors 420. As indicated in FIG. 4, each of two sets of the capacitors 420 are binarily weighted. Each of the switches 410 is configured to selectively connect the respective one capacitor 420 connected thereto to either a bias voltage (V bias + or V bias −) or to output node OUT. In some embodiments, the switches 410 are configured to selectively connect the respective one capacitor connected thereto to output node OUT through optional resistor 430. Each of the switches 410 selectively connects the respective one capacitor 420 connected thereto to either the bias voltage or to the output node based on one of control signals C1-C6 from communication bus CONTROL.

In operation, prior to receiving an indication that the current load of system 30 on the VDD power supply is expected to change, system 30 outputs control signals C1-C6 which causes each of the capacitors to be connected to one of the bias voltage signals V bias + or V bias −. Accordingly, some of the capacitors are pre-charged to bias voltage V bias +, and others of the capacitors are pre-charged to bias voltage V bias −.

Once system 30 receives an indication that the current load of system 30 on the VDD power supply is expected to change, system 30 determines values for control signals C1-C6 based on a magnitude and a sign of the preemptive change in the voltage VDD. System 30 determines these values based on the indication, as discussed in more detail elsewhere herein.

In response to the indication, system 30 changes the values of the control signals C1-C6 so as to cause one or more of the capacitors connected to bias voltage V bias + to be connected to the output node OUT, or to cause one or more of the capacitors connected to bias voltage V bias − to be connected to the output node OUT, where causing the capacitors connected to bias voltage V bias + to be connected to the output node OUT causes the voltage at the output node OUT to increase, and where causing the capacitors connected to bias voltage V bias − to be connected to the output node OUT causes the voltage at the output node OUT to decrease.

In some embodiments, the output node OUT is connected to the reference voltage Vref node in voltage regulator 300. In such embodiments, if the indication is associated with an expected increase in the current load of system 30 on the VDD power supply, system 30 changes the values of control signals C1-C6 so as to cause one or more of the capacitors connected to bias voltage V bias+ to be connected to output node OUT. In response to the capacitors being connected to output node OUT, the voltage at the reference voltage Vref node increases, and voltage regulator 300 causes the VDD voltage to increase.

Likewise, in embodiments where the output node OUT is connected to the reference voltage Vref node in voltage regulator 300, if the indication is associated with an expected decrease in the current load of system 30 on the VDD power supply, system 30 changes the values of control signals C1-C6 so as to cause one or more of the capacitors connected to bias voltage V bias − to be connected to output node OUT. In response to the capacitors being connected to output node OUT, the voltage at the reference voltage Vref node decreases, and voltage regulator 300 causes the VDD voltage to decrease.

In some embodiments, the output node OUT is connected to the feedback voltage Vfb node in voltage regulator 300. In such embodiments, if the indication is associated with an expected increase in the current load of system 30 on the VDD power supply, system 30 changes the values of control signals C1-C6 so as to cause one or more of the capacitors connected to bias voltage V bias − to be connected to output node OUT. In response to the capacitors being connected to output node OUT, the voltage at the feedback voltage Vfb node decreases, and voltage regulator 300 causes the VDD voltage to increase.

Likewise, in embodiments where the output node OUT is connected to the feedback voltage Vfb node in voltage regulator 300, if the indication is associated with an expected decrease in the current load of system 30 on the VDD power supply, system 30 changes the values of control signals C1-C6 so as to cause one or more of the capacitors connected to bias voltage V bias + to be connected to output node OUT. In response to the capacitors being connected to output node OUT, the voltage at the feedback voltage Vfb node increases, and voltage regulator 300 causes the VDD voltage to decrease.

Figure 5:
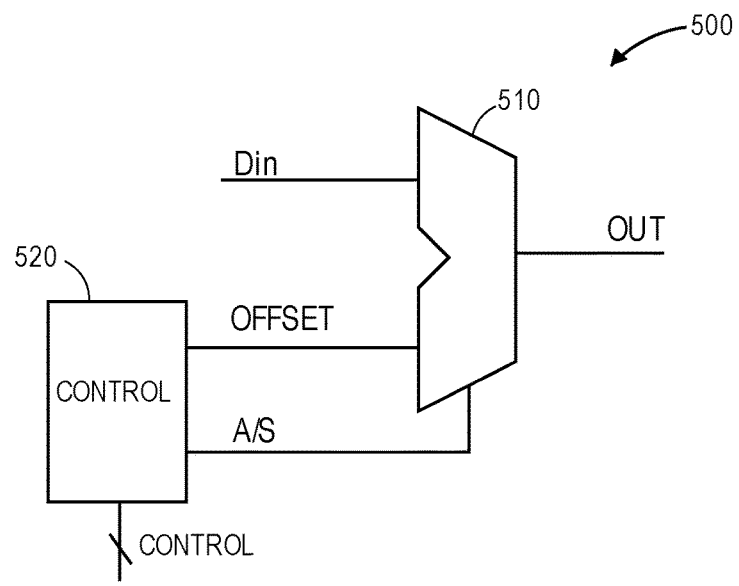
FIG. 5 is a schematic illustration of an embodiment of a boost circuit.

FIG. 5 is a schematic illustration of an embodiment of a boost circuit 500, which may be used as boost circuit 340 in voltage regulator 300 of FIG. 3. Boost circuit 500 includes digital adder/subtracter 510 and control circuit 520.

Based on the control signal at node A/S, adder/subtracter 510 is configured to add the digital value of the digital signal at node offset to the digital value of the digital signal at bus DIN or to subtract the digital value of the digital signal at node offset from the digital value of the digital signal at bus DIN, and to generate a digital output word at output bus OUT.

Based on the control signals on communication bus CONTROL, control circuit 520 is configured to generate the control signal at node A/S corresponding with whether the adder/subtracter 510 is to add or subtract. In addition, based on the control signals on communication bus CONTROL, control circuit 520 is configured to generate a digital word on the node offset corresponding with a magnitude of the preemptive change to be implemented.

In some embodiments, the output bus OUT is connected to bus BDIN. In such embodiments, in response an indication that the current load of system 30 on the VDD power supply is expected to change, system 30 determines values for the control signals on communication bus CONTROL based on a magnitude and a sign of the preemptive change in the voltage VDD to mitigate or limit the voltage excursion in the voltage VDD caused by the change in current load of system 30. System 30 determines these values based on the indication, as discussed in more detail elsewhere herein.

For example, if the indication is associated with an expected increase in the current load of system 30 on the VDD power supply, system 30 changes the values of the control signals so as to cause the A/S signal to cause adder/subtracter 510 to add the digital value of the digital signal at node offset to the digital value of the digital signal at bus DIN. In response to the increased value of the digital word at bus DIN, the voltage at the reference voltage Vref node increases, and voltage regulator 300 causes the VDD voltage to increase.

Similarly, if the indication is associated with an expected decrease in the current load of system 30 on the VDD power supply, system 30 changes the values of the control signals so as to cause the A/S signal to cause adder/subtracter 510 to subtract the digital value of the digital signal at node offset from the digital value of the digital signal at bus DIN. In response to the decreased value of the digital word at bus DIN, the voltage at the reference voltage Vref node decreases, and voltage regulator 300 causes the VDD voltage to decrease.

Figure 6:
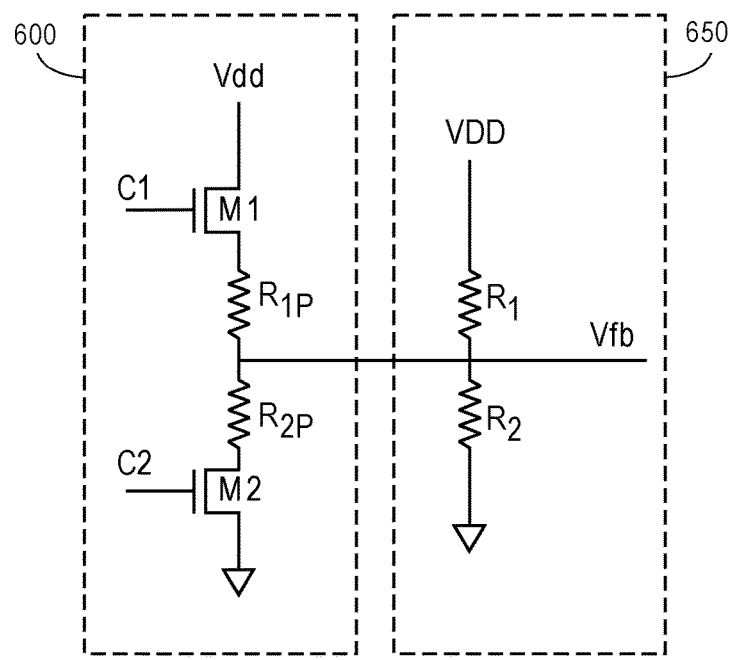
FIG. 6 includes a schematic illustration of an embodiment of a boost circuit.

FIG. 6 includes a schematic illustration of an embodiment of a boost circuit 600, which may be used as boost circuit 340 in voltage regulator 300 of FIG. 3. FIG. 6 also includes a schematic illustration of an embodiment of a feedback circuit 650, which may be used as feedback circuit 330 of FIG. 3. As shown, boost circuit 600 is connected with feedback circuit 650 at node Vfb.

Feedback circuit 650 and boost circuit 600 cooperatively generate a voltage at node Vfb. When transistor M1 and transistor M2 are both off, the voltage generated at node Vfb equals VDD[R2/(R1+R2)]. When transistor M1 is on and transistor M2 is off, the voltage generated at node Vfb equals VDD[R2/((R1∥R1P)+R2)]. When transistor M1 is off and transistor M2 is on, the voltage generated at node Vfb equals VDD[(R2)/((R1∥R1P)+R2). When transistor M1 is on and transistor M2 is on, the voltage generated at node Vfb equals VDD[[(R2∥R2P)/((R1∥R1P)+(R2∥R2P)). As understood by those of skill in the art, A∥B=A*B/(A+B).

In some embodiments, the node Vfb is connected to node Vfb of voltage regulator 300. In such embodiments, in response an indication that the current load of system 30 on the VDD power supply is expected to change, system 30 determines values for the control signals on communication bus CONTROL based on a magnitude and a sign of the preemptive change in the voltage VDD to mitigate or limit the voltage excursion in the voltage VDD caused by the change in current load of system 30. System 30 determines these values based on the indication, as discussed in more detail elsewhere herein.

For example, if the indication is associated with an expected increase in the current load of system 30 on the VDD power supply, system 30 changes the values of the control signals C1 and C2 to cause boost circuit 600 to decrease the voltage at node Vfb, for example by causing transistor M1 to be on and causing transistor M2 to be off.

In response to the decreased voltage at node Vfb, the voltage at the reference voltage Vref node increases, and voltage regulator 300 causes the VDD voltage to increase.

Similarly, if the indication is associated with an expected decrease in the current load of system 30 on the VDD power supply, system 30 changes the values of the control signals C1 and C2 to cause boost circuit 600 to increase the voltage at node Vfb, for example by causing transistor M1 to be off and causing transistor M2 to be on. In response to the increased voltage at node Vfb, the voltage at the reference voltage Vref node decreases, and voltage regulator 300 causes the VDD voltage to decrease.

Figure 7:
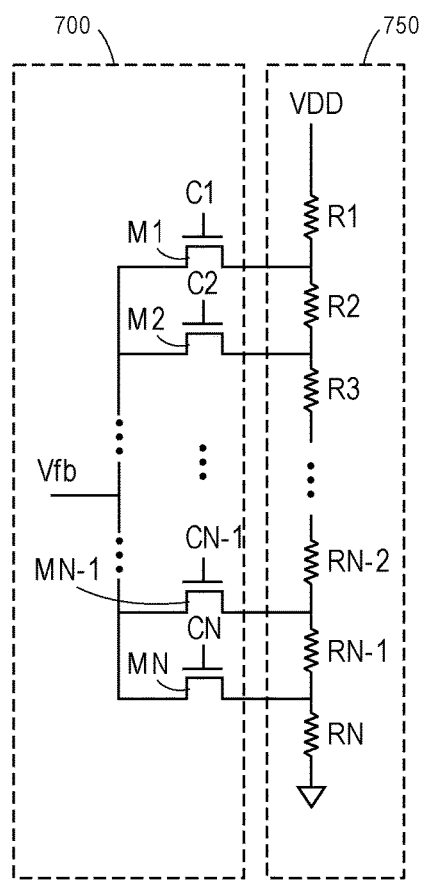
FIG. 7 includes a schematic illustration of an embodiment of a boost circuit.

FIG. 7 includes a schematic illustration of an embodiment of a boost circuit 700, which may be used as boost circuit 340 in voltage regulator 300 of FIG. 3. FIG. 7 also includes a schematic illustration of an embodiment of a feedback circuit 750, which may be used as feedback circuit 330 of FIG. 3.

As shown, feedback circuit 750 includes a resistor ladder having resistors R1-RN, and boost circuit 700 is connected with feedback circuit 650 at each of the nodes connecting resistors of the resistor ladder.

Feedback circuit 650 and boost circuit 600 cooperatively generate a voltage at node Vfb. Feedback circuit 750 generates a plurality of voltages, each at one of the nodes connecting resistors of the resistor ladder, as understood by those of skill in the art. One of the transistors M1-MN is turned on, such that voltage at node Vfb is equal to the voltage of the node of the resistor ladder connected to the turned on transistor.

In some embodiments, the node Vfb is connected to node Vfb of voltage regulator 300. In such embodiments, in response an indication that the current load of system 30 on the VDD power supply is expected to change, system 30 determines values for the control signals on communication bus CONTROL based on a magnitude and a sign of the preemptive change in the voltage VDD to mitigate or limit the voltage excursion in the voltage VDD caused by the change in current load of system 30. System 30 determines these values based on the indication, as discussed in more detail elsewhere herein.

For example, if the indication is associated with an expected increase in the current load of system 30 on the VDD power supply, system 30 changes the values of the control signals C1-CN to cause boost circuit 700 to decrease the voltage at node Vfb, for example by causing transistor AX to turn off and causing transistor MY to turn on, where Y is greater than X. In response to the decreased voltage at node Vfb, the voltage at the reference voltage Vref node increases, and voltage regulator 300 causes the VDD voltage to increase.

Similarly, if the indication is associated with an expected decrease in the current load of system 30 on the VDD power supply, system 30 changes the values of the control signals C1-CN to cause boost circuit 700 to increase the voltage at node Vfb, for example by causing transistor AY to turn off and causing transistor MX to turn on, where Y is greater than X. In response to the increased voltage at node Vfb, the voltage at the reference voltage Vref node decreases, and voltage regulator 300 causes the VDD voltage to decrease.

Figure 8:
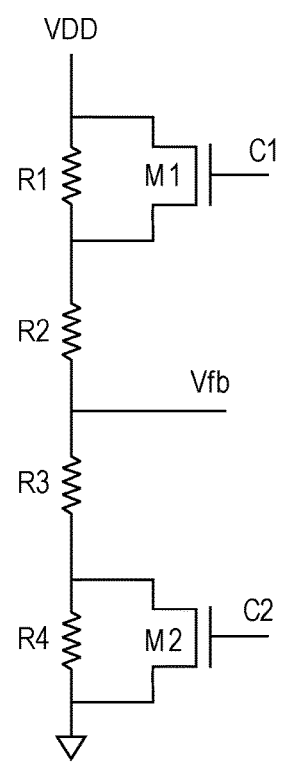
FIG. 8 includes a schematic illustration of an embodiment of a boost circuit.

FIG. 8 includes a schematic illustration of an embodiment of a boost circuit 600, which is integrated with the feedback circuit. Circuit 800 May be used as boost circuit 340 in voltage regulator 300 of FIG. 3 and as feedback circuit 330 of FIG. 3.

Boost circuit 800 generates a voltage at node Vfb. When transistor M1 and transistor M2 are both off, the voltage generated at node Vfb equals VDD[(R3+R4)/{(R1+R2)+ (R3+R4)}]. When transistor M1 is on and transistor M2 is off, the voltage generated at node Vfb equals VDD[(R3+ R4)/{(R2)+(R3+R4)}]. When transistor M1 is off and transistor M2 is on, the voltage generated at node Vfb equals VDD[(R3)/{(R1+R2)+(R3)}]. When transistor M1 is on and transistor M2 is on, the voltage generated at node Vfb equals VDD[(R3)/{(R2)+(R3)}].

In some embodiments, the node Vfb is connected to node Vfb of voltage regulator 300. In such embodiments, in response an indication that the current load of system 30 on the VDD power supply is expected to change, system 30 determines values for the control signals on communication bus CONTROL based on a magnitude and a sign of the preemptive change in the voltage VDD to mitigate or limit the voltage excursion in the voltage VDD caused by the change in current load of system 30. System 30 determines these values based on the indication, as discussed in more detail elsewhere herein.

For example, if the indication is associated with an expected increase in the current load of system 30 on the VDD power supply, system 30 changes the values of the control signals C1 and C2 to cause boost circuit 800 to decrease the voltage at node Vfb, for example by causing transistor M1 to be off and causing transistor M2 to be on. In response to the decreased voltage at node Vfb, the voltage at the reference voltage Vref node increases, and voltage regulator 300 causes the VDD voltage to increase.

Similarly, if the indication is associated with an expected decrease in the current load of system 30 on the VDD power supply, system 30 changes the values of the control signals C1 and C2 to cause boost circuit 800 to increase the voltage at node Vfb, for example by causing transistor M1 to be on and causing transistor M2 to be off. In response to the increased voltage at node Vfb, the voltage at the reference voltage Vref node decreases, and voltage regulator 300 causes the VDD voltage to decrease.

Figure 9:
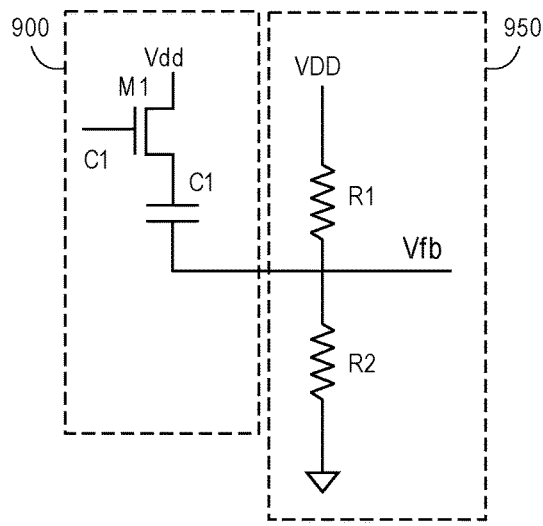
FIG. 9 includes a schematic illustration of an embodiment of a boost circuit.

FIG. 9 includes a schematic illustration of an embodiment of a boost circuit 900, which may be used as boost circuit 340 in voltage regulator 300 of FIG. 3. FIG. 9 also includes a schematic illustration of an embodiment of a feedback circuit 950, which may be used as feedback circuit 330 of FIG. 3. As shown, boost circuit 900 is connected with feedback circuit 950 at node Vfb.

Feedback circuit 950 and boost circuit 900 cooperatively generate a voltage at node Vfb. When transistor M1 is off, the voltage generated at node Vfb equals VDD [R2/(R1+ R2)]. When transistor M1 is on, the voltage generated at node Vfb equals VDD[R2/((R1∥C1)+R2)]. Accordingly, when used in voltage regulator 300, feedback circuit 950 selectively adds a zero to the frequency response of voltage regulator 300. When added, the zero increases the bandwidth of the voltage regulator 300. Consequently, with the zero added, the response of voltage regulator 300 to the voltage change at the VDD power supply is faster. In some embodiments, the duration of the on time of transistor M1 is controlled by control circuit 330 based on the information received on communication bus CONTROL from system 30.

In some embodiments, boost circuit 900 includes one or more additional legs, each having a switch and a capacitor serially connected, and each being in parallel with the serially connected switch M1 and capacitor C1, where the frequency of the introduced zero is controlled by control circuit 330 by selectively causing one or more of the switches to be conductive.

In some embodiments, the node Vfb is connected to node Vfb of voltage regulator 300. In such embodiments, in response an indication that the current load of system 30 on the VDD power supply is expected to change, system 30 determines values for the control signals on communication bus CONTROL based on a magnitude and a sign of the preemptive change in the voltage VDD to mitigate or limit the voltage excursion in the voltage VDD caused by the change in current load of system 30. System 30 determines these values based on the indication, as discussed in more detail elsewhere herein.

For example, if the indication is associated with an expected increase or decrease in the current load of system 30 on the VDD power supply, system 30 changes the value of the control signal C1 to cause boost circuit 900 and a zero to the frequency response of voltage regulator 300, for example by causing transistor M1 to be on. Because of the added zero, the response of voltage regulator 300 to the voltage change at the VDD power supply is faster, and the voltage excursion in the voltage VDD caused by the change in current load of system 30 is limited. In some embodiments, the duration of the on time of transistor M1 is based on information received on communication bus CONTROL from system 30. For example, in some embodiments, the duration of the on time of transistor M1 may be about 1 ns, 5 ns, 10 ns, 20 ns, or 50 ns.

Figure 10:
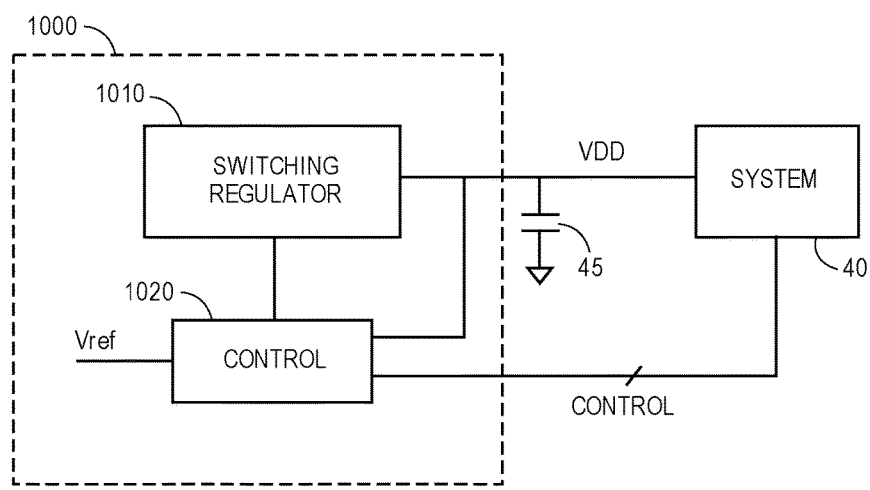
FIG. 10 is a block diagram of a voltage regulator providing a VDD power supply voltage to system.

FIG. 10 is a block diagram of a voltage regulator 1000 providing a VDD power supply voltage to system 40. Voltage regulator 1000 includes switching regulator 1010, and control circuit 1020. In some embodiments, voltage regulator 1000, capacitor 45, and system 40 are integrated on a single substrate. In some embodiments, the capacitor 45 operates effectively to reduce the magnitude of VDD voltage transients despite being small enough to be integrated because of the preemptive voltage regulator control discussed herein. In some embodiments, the substrate comprises a semiconductor. In alternative embodiments, one or more of the capacitor 45 and the system 40 is on a substrate separate from the substrate of the voltage regulator 1000.

Switching regulator 1010 may be any type of switching regulator. For example switching regulator 1010 may be or include a step-down buck regulator, a step-up boost regulator, and/or an inverter fly back regulator. In some embodiments, switching regulator is or includes a fixed "on time" regulator.

Switching regulator 1010 is configured to generate a voltage at the VDD power supply according to input signals which control the conductivity state of one or more switches in switching regulator 1010.

Control circuit 1020 is configured to sense the voltage at the VDD power supply and to sense a reference voltage at node Vref. Based on the sensed voltages, control circuit 1020 generates the input signals for switching regulator 1010, which cause the conductivity state of the switches of switching regulator 1010 to change so that switching regulator 1010 generates the voltage at the VDD power supply, as understood by those of skill in the art.

System 40 functions and operates similarly to system 30 of FIG. 3 with regard to transient loads and expected and anticipated transient loads.

Control circuit 1020 is configured to respond to information received from system 40 via communication bus CONTROL by changing the input signals for switching regulator 1010 so as to cause the voltage VDD to preemptively change to mitigate or limit the voltage excursion in the voltage VDD caused by the change in current load of system 40. In some embodiments, the duration of the preemptive VDD voltage change is controlled by control circuit 1020 based on information received on communication bus CONTROL from system 40. In some embodiments, the time profile of the VDD voltage increase or decrease is controlled by control circuit 1020 based on information received on communication bus CONTROL from system 40, for example to match an expected profile of the anticipated change in current load of system 40.

For example, in some embodiments, switching regulator 1010 is a fixed "on time" regulator. In such embodiments, switching regulator 1010 has a high side circuit configured to source current to the output for a fixed duration time period in each of a series of cycles, and a low side circuit configured to sink current from the output for a controlled duration time period in each of the cycles. In response to the information received from system 40 via communication bus CONTROL, control circuit 1020 may be configured to change the input signals for switching regulator 1010 so as to cause a change in the duration of the controlled duration time period during which the low side circuit sinks current in each of the cycles.

In such embodiments, in response an indication that the current load of system 40 on the VDD power supply is expected to change, system 40 determines values for the control signals on communication bus CONTROL based on a magnitude and a sign of the preemptive change in the voltage VDD to mitigate or limit the voltage excursion in the voltage VDD caused by the change in current load of system 40. System 40 determines these values based on the indication, as discussed in more detail elsewhere herein.

For example, if the indication is associated with an expected increase in the current load of system 40 on the VDD power supply, system 40 changes the values of the control signals to cause control circuit 1020 to decrease the duration of the controlled duration time period during which the low side circuit sinks current in each of the cycles. In response to the decreased duration of the controlled duration time period during which the low side circuit sinks current in each of the cycles, the VDD voltage increases.

Similarly, if the indication is associated with an expected decrease in the current load of system 40 on the VDD power supply, system 40 changes the values of the control signals to cause control circuit 1020 to increase the duration of the controlled duration time period during which the low side circuit sinks current in each of the cycles. In response to the increased duration of the controlled duration time period during which the low side circuit sinks current in each of the cycles, the VDD voltage decreases.

As understood by those of skill in the art, control circuit 1020 is configured to generate input signals for switching regulator 1010 according to the operation and functionality of switching regulator 1010, such that control signals from system 40 indicating an anticipated increase in the current load of system 40 causes control circuit 1020 to generate input signals for switching regulator 1010, which cause switching regulator 1010 to increase the voltage at the VDD power supply to mitigate or limit the voltage excursion in the voltage VDD caused by the anticipated change in current load of system 40.

As understood by those of skill in the art, control circuit 1020 is likewise configured to generate input signals for switching regulator 1010 according to the operation and functionality of switching regulator 1010, such that control signals from system 40 indicating an anticipated decrease in the current load of system 40 causes control circuit 1020 to generate input signals for switching regulator 1010, which cause switching regulator 1010 to decrease the voltage at the VDD power supply to mitigate or limit the voltage excursion in the voltage VDD caused by the anticipated change in current load of system 40.

Figure 11:
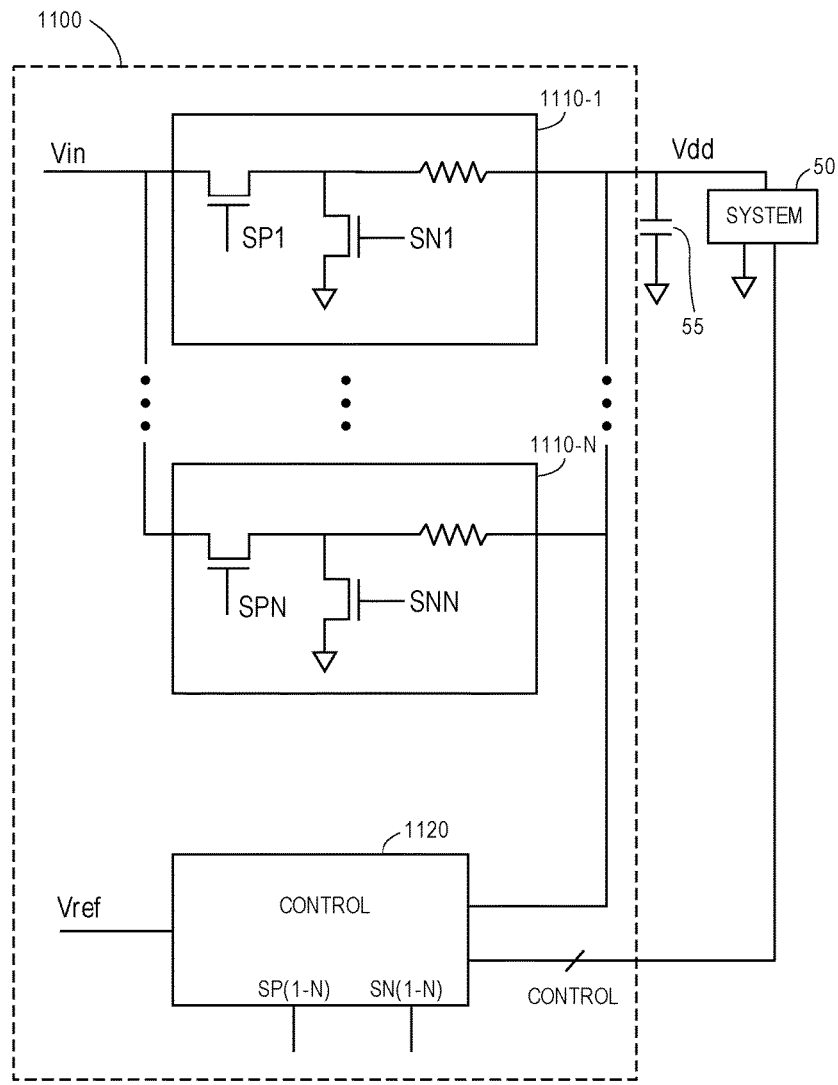
FIG. 11 is a block diagram of a multiphase voltage regulator providing a VDD power supply voltage to a system.

FIG. 11 is a block diagram of a multiphase voltage regulator 1100 providing a VDD power supply voltage to system 50. Multiphase voltage regulator 1100 includes N phase stages 1110 and control circuit 1120. In some embodiments, voltage regulator 1100, capacitor 55, and system 50 are integrated on a single substrate. In some embodiments, the capacitor 55 operates effectively to reduce the magnitude of VDD voltage transients despite being small enough to be integrated because of the preemptive voltage regulator control discussed herein. In some embodiments, the substrate comprises a semiconductor. In alternative embodiments, one or more of the capacitor 55 and the system 50 is on a substrate separate from the substrate of the voltage regulator 1100.

Each of the phase stages 1110 is configured to provide power to the VDD power supply with a voltage and a current determined by input signals SPx and SNx, as understood by those of skill in the art.

Control circuit 1120 is configured to sense the voltage at the VDD power supply and to sense a reference voltage at node Vref. Based on the sensed voltages, control circuit 1120 generates the input signals for the phase stages 1110, which cause the phase stages 1110 to generate the voltage at the VDD power supply, as understood by those of skill in the art.

System 50 functions and operates similarly to system 30 of FIG. 3 with regard to transient loads and expected and anticipated transient loads.

Control circuit 1120 is configured to respond to information received from system 50 via communication bus CONTROL by changing the input signals for the phase stages 1110 so as to cause the voltage VDD to preemptively change to mitigate or limit the voltage excursion in the voltage VDD caused by the change in current load of system 50. In some embodiments, the duration of changed input signals before returning to their prior state is controlled by control circuit 1120 based on information received on communication bus CONTROL from system 50. In some embodiments, the time profile of the VDD voltage increase or decrease is controlled by control circuit 1120 based on information received on communication bus CONTROL from system 50, for example to match an expected profile of the anticipated change in current load of system 50.

For example, in response an indication that the current load of system 50 on the VDD power supply is expected to change, system 50 determines values for the control signals on communication bus CONTROL based on a magnitude and a sign of the preemptive change in the voltage VDD to mitigate or limit the voltage excursion in the voltage VDD caused by the change in current load of system 50. System 50 determines these values based on the indication, as discussed in more detail elsewhere herein.

For example, if the indication is associated with an expected increase in the current load of system 50 on the VDD power supply, system 50 changes the values of the control signals to cause control circuit 1120 to change input signals SP1-N and SN1-N, where the change causes phase stages 1110 to force the voltage at the VDD power supply to increase. The changed input signals SP1-N and SN1-N may increase the ratio of high time (during which the phase stages 1110 each cause the voltage at their respective switch nodes Vsw1-VswN to be at or near the input voltage Vin) to low time (during which the phase stages 1110 each cause the voltage at their respective switch nodes Vsw1-VswN to be at or near the ground voltage). Additionally or alternatively, the changed input signals SP1-N and SN1-N may increase the number of phase stages 1110 which contribute to supplying power to the VDD power supply.

Similarly, if the indication is associated with an expected decrease in the current load of system 50 on the VDD power supply, system 50 changes the values of the control signals to cause control circuit 1120 to change input signals SP1-N and SN1-N, where the change causes phase stages 1110 to force the voltage at the VDD power supply to decrease. The changed input signals SP1-N and SN1-N may decrease the ratio of high time (during which the phase stages 1110 each cause the voltage at their respective switch nodes Vsw1-VswN to be at or near the input voltage Vin) to low time (during which the phase stages 1110 each cause the voltage at their respective switch nodes Vsw1-VswN to be at or near the ground voltage). Additionally or alternatively, the changed input signals SP1-N and SN1-N may decrease the number of phase stages 1110 which contribute to supplying power to the VDD power supply.

Figure 12:
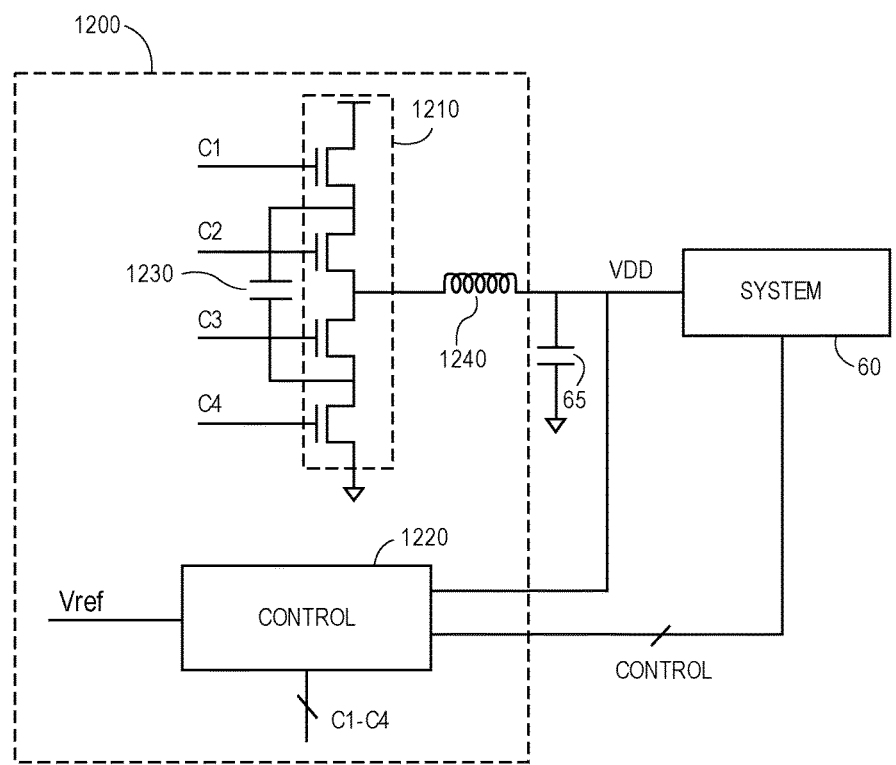
FIG. 12 is a block diagram of a R2D voltage regulator providing a VDD power supply voltage to a system.

FIG. 12 is a block diagram of a R2D voltage regulator 1200 providing a VDD power supply voltage to system 60. R2D voltage regulator 1200 includes switch stack 1210, charging capacitor 1230, series inductor 1240, and control circuit 1220. In some embodiments, R2D voltage regulator 1200, capacitor 65, and system 60 are integrated on a single substrate. In some embodiments, the capacitor 65 operates effectively to reduce the magnitude of VDD voltage transients despite being small enough to be integrated because of the preemptive voltage regulator control discussed herein. In some embodiments, the substrate comprises a semiconductor. In alternative embodiments, one or more of the capacitor 65 and the system 60 is on a substrate separate from the substrate of the voltage regulator 1200.

As understood by those of skill in the art, the conductivity states of the switches of switch stack 1210 are controlled by controller 1220 so as to deliver power to system 60 by repetitively causing current to flow through inductor 1240 prior to store energy in the inductor which is subsequently used to charge and discharge charge capacitor 1230. For example, U.S. Pat. Nos. 9,780,656, and 9,780,663, which are incorporated herein by reference, describe particular embodiments of switching sequences which may be used to deliver power to system 60. Other switching sequences may alternatively be used.

For example, in some embodiments, prior to charging and discharging charge capacitor 1230, a voltage is driven across inductor 1240 for a time period to induce a pre-flux current in inductor 1240. If the time period is increased, the pre-flux current in inductor 1240 increases, and the voltage at the VDD power supply increases. Likewise, if the time period is decreased, the pre-flux current in inductor 1240 decreases, and the voltage at the VDD power supply decreases.

Control circuit 1120 is configured to sense the voltage at the VDD power supply and to sense a reference voltage at node Vref. Based on the sensed voltages, control circuit 1120 generates the input signals C1-C4 for the switches of switch stack 1210. The input signals C1-C4 cause switch stack 1210 to be sequentially switch so as to generate the voltage at the VDD power supply.

System 60 functions and operates similarly to system 30 of FIG. 3 with regard to transient loads and expected and anticipated transient loads.

Control circuit 1220 is configured to respond to information received from system 60 via communication bus CONTROL by changing the input signals C1-C4 for switch stack 1210 so as to cause the voltage VDD to preemptively change to mitigate or limit the voltage excursion in the voltage VDD caused by the change in current load of system 60. In some embodiments, the duration of changed input signals C1-C4 before returning to their prior state is controlled by control circuit 1220 based on information received on communication bus CONTROL from system 60. In some embodiments, the time profile of the VDD voltage increase or decrease is controlled by control circuit 1220 based on information received on communication bus CONTROL from system 60, for example to match an expected profile of the anticipated change in current load of system 60.

For example, in response an indication that the current load of system 60 on the VDD power supply is expected to change, system 60 determines values for the control signals on communication bus CONTROL based on a magnitude and a sign of the preemptive change in the voltage VDD to mitigate or limit the voltage excursion in the voltage VDD caused by the change in current load of system 60. System 60 determines these values based on the indication, as discussed in more detail elsewhere herein.

For example, if the indication is associated with an expected increase in the current load of system 60 on the VDD power supply, system 60 changes the value of the control signals to cause control circuit 1220 to change the timing of input signals C1-C4, where the change causes switch stack 1210 to force the voltage at the VDD power supply to increase. The changed input signals C1-C4 may increase durations of periods during which the switch stack 1210 causes the pre-flux current in inductor 1240. The voltage at the VDD power supply increases as a result of the increased pre-flux current in inductor 1240.

Similarly, if the indication is associated with an expected decrease in the current load of system 60 on the VDD power supply, system 60 changes the value of the control signals to cause control circuit 1220 to change the timing of input signals C1-C4, where the change causes switch stack 1210 to force the voltage at the VDD power supply to decrease. The changed input signals C1-C4 may decrease durations of periods during which the switch stack 1210 causes the pre-flux current in inductor 1240. The voltage at the VDD power supply decreases as a result of the decreased pre-flux current in inductor 1240.

In some embodiments, a voltage regulator configured to provide power to a system may selectively operate in either a voltage regulation mode or a current regulation mode, where the bandwidth of the voltage regulation mode is higher than the bandwidth of the current regulation mode. In accordance with the principles discussed herein, a controller may be configured to cause the voltage regulator to switch modes in response to a signal from the system to mitigate or limit the voltage excursion in the voltage VDD caused by the expected change in current load of system.

In some embodiments, a voltage regulator configured to provide power to a system may operate according to a feedback loop having a gain and a bandwidth. In accordance with the principles discussed herein, in response to a signal from the system, a controller may be configured to cause an increase or decrease in the gain and the bandwidth of the voltage regulator to mitigate or limit the voltage excursion in the voltage VDD caused by the expected change in current load of the system. For example, the feedback loop may have a difference amplifier affecting the gain and bandwidth, and the controller may be configured to change a bias current used by the difference amplifier to change the gain and bandwidth, as understood by those of skill in the art.

Figure 13:
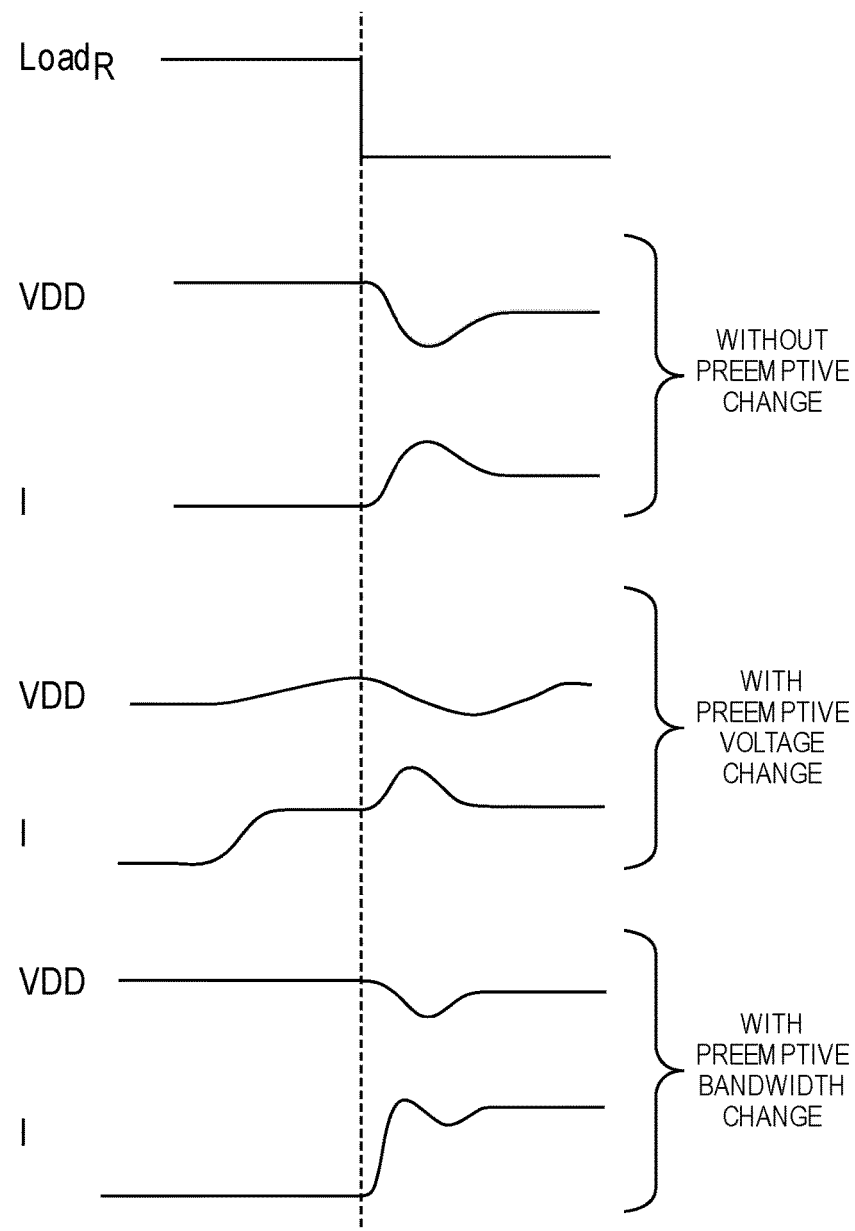
FIG. 13 is a waveform diagram illustrating an example transient responses of voltage regulators discussed herein.

FIG. 13 is a waveform diagram illustrating an example transient responses of voltage regulators discussed herein as compared with the transient response of voltage regulator 110. As discussed above, voltage regulator 110 does not preemptively mitigate or limit the voltage excursion in the voltage VDD caused by the expected change in current load of a system being powered thereby.

As discussed above, some embodiments of voltage regulators discussed herein preemptively change the voltage at the VDD power supply prior to the occurrence of a change in current load. Characteristics of the transient response of the regulators of these embodiments are illustrated in the VDD and I waveforms labeled "With Preemptive Voltage Change."

As shown, the voltage excursion during the transient response of voltage regulators which preemptively change the voltage at the VDD power supply is dramatically less than the corresponding voltage excursion experienced by voltage regulators with no preemptive change.

As discussed above, some embodiments of voltage regulators discussed herein preemptively change voltage regulator bandwidth prior to the occurrence of a change in current load. Characteristics of the transient response of the regulators of these embodiments are illustrated in the VDD and I waveforms labeled "With Preemptive Bandwidth Change."

As shown, the voltage excursion during the transient response of voltage regulators which preemptively change the voltage regulator bandwidth is dramatically less than the corresponding voltage excursion experienced by voltage regulators with no preemptive change.

In some embodiments, both the voltage at the VDD power supply and the voltage regulator bandwidth are preemptively changed.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

What is claimed is:

1. A circuit, comprising:
    a power supply node;
    a system configured to receive current from the power supply node at a regulated voltage and to generate one or more control signals indicating an anticipated change in the current;
    a voltage regulator configured to provide the current to the power supply node and to drive the power supply node with the regulated voltage, wherein the voltage regulator is configured to change the value of the regulated voltage in response to the one or more control signals, and wherein the voltage regulator comprises:
        a difference amplifier configured to drive the power supply node with the regulated voltage having a value based on a difference between a reference voltage and a feedback voltage,
        a feedback circuit configured to generate the feedback voltage based on the voltage of the power supply node, and
        a boost circuit, configured to change the reference voltage based on the control signals.

2. The circuit of claim 1, wherein the voltage regulator functions according to a bandwidth, wherein the one or more control signals correspond with an increased bandwidth of the voltage regulator, and wherein the voltage regulator is configured to, in response to receiving the control signals, function according to the increased bandwidth.

3. The circuit of claim 1, wherein the boost circuit is configured to change the reference voltage by changing a digital input to a digital to analog converter configured to generate the reference voltage.

4. The circuit of claim 1, wherein the boost circuit is configured to change the reference voltage by capacitively coupling an amount of charge onto a voltage reference node.

5. A circuit, comprising:
    a power supply node;
    a system configured to receive current from the power supply node at a regulated voltage and to generate one or more control signals indicating an anticipated change in the current; and
    a voltage regulator configured to provide the current to the power supply node and to drive the power supply node with the regulated voltage, wherein the voltage regulator is configured to change the value of the regulated voltage in response the one or more control signals, and wherein the voltage regulator comprises:
        a difference amplifier configured to drive the power supply node with a voltage based on a difference between a reference voltage and a feedback voltage,
        a feedback circuit configured to generate the feedback voltage based on the voltage of the power supply node, and
        a boost circuit, configured to change the feedback voltage based on the control signals.

6. The circuit of claim 5, wherein the feedback circuit is configured to generate the feedback voltage such that the feedback voltage is substantially equal to a factor times the voltage of the power supply node, and wherein the boost circuit is configured to change the feedback voltage by changing the factor.

7. The circuit of claim 5, wherein the boost circuit is configured to change the feedback voltage by capacitively coupling an amount of charge onto a feedback voltage node.

8. The circuit of claim 1, wherein the voltage regulator comprises a switching regulator.

9. The circuit of claim 1, wherein the voltage regulator comprises a R2D regulator.

10. A method of operating a circuit, the method comprising:
    with a power supply node, providing current at a regulated voltage to a system;
    with the system, receiving the current;
    with the system, generating one or more control signals indicating an anticipated change in the current;
    with a voltage regulator, providing the current to the power supply node;
    with the voltage regulator, driving the power supply node with the regulated voltage;
    with the voltage regulator, changing the value of the regulated voltage in response to the one or more control signals;
    with a difference amplifier of the voltage regulator, driving the power supply node such that the value of the regulated voltage is based on a difference between a reference voltage and a feedback voltage;
    with a feedback circuit of the voltage regulator, generating the feedback voltage based on the voltage of the power supply node; and
    with a boost circuit of the voltage regulator, changing the reference voltage based on the control signals.

11. The method of claim 10, wherein the voltage regulator functions according to a bandwidth, wherein the one or more control signals correspond with an increased bandwidth of the voltage regulator, and wherein the voltage regulator is configured to, in response to receiving the control signals, function according to the increased bandwidth.

12. The method of claim 10, wherein the boost circuit is configured to change the reference voltage by changing a digital input to a digital to analog converter configured to generate the reference voltage.

13. The method of claim 10, wherein the boost circuit is configured to change the reference voltage by capacitively coupling an amount of charge onto a voltage reference node.

14. The A method of operating a circuit, the method comprising:
   with a power supply node, providing current at a regulated voltage to a system;
   with the system, receiving the current;
   with the system, generating one or more control signals indicating an anticipated change in the current;
   with a voltage regulator, providing the current to the power supply node;
   with the voltage regulator, driving the power supply node with the regulated voltage;
   with the voltage regulator, changing the value of the regulated voltage in response to the one or more control signals;
   with a difference amplifier of the voltage regulator, driving the power supply node with a voltage based on a difference between a reference voltage and a feedback voltage;
   with a feedback circuit of the voltage regulator, generating the feedback voltage based on the voltage of the power supply node; and
   with a boost circuit of the voltage regulator, changing the feedback voltage based on the control signals.

15. The method of claim 14, further comprising, with the feedback circuit, generating the feedback voltage such that the feedback voltage is substantially equal to a factor times the voltage of the power supply node, and wherein the boost circuit is configured to change the feedback voltage by changing the factor.

16. The method of claim 14, wherein the boost circuit is configured to change the feedback voltage by capacitively coupling an amount of charge onto a feedback voltage node.

17. The method of claim 10, wherein the voltage regulator comprises a switching regulator.

18. The method of claim 10 is nice water you cleaning people are and will be, wherein the voltage regulator comprises a R2D regulator.

19. The circuit of claim 5, wherein the voltage regulator functions according to a bandwidth, wherein the one or more control signals correspond with an increased bandwidth of the voltage regulator, and wherein the voltage regulator is configured to, in response to receiving the control signals, function according to the increased bandwidth.

20. The method of claim 14, wherein the voltage regulator functions according to a bandwidth, wherein the one or more control signals correspond with an increased bandwidth of the voltage regulator, and wherein the voltage regulator is configured to, in response to receiving the control signals, function according to the increased bandwidth.

* * * * *

UNITED STATES PATENT AND TRADEMARK OFFICE
CERTIFICATE OF CORRECTION

PATENT NO. : 10,355,584 B1
APPLICATION NO. : 16/024404
DATED : July 16, 2019
INVENTOR(S) : Parag Oak and David Lidsky Page 1 of 1

It is certified that error appears in the above-identified patent and that said Letters Patent is hereby corrected as shown below:

In the Claims

Column 18, Claim 18, Line 14, please update as follows: "The method of claim 11 wherein the voltage regulator comprises a R2D regulator."

Column 18, Claim 18, Line 14, please remove "claim 10 is nice water you cleaning"

Column 18, Claim 18, Line 15, please remove "people are and will be,"

Signed and Sealed this
Twelfth Day of May, 2020

Andrei Iancu
*Director of the United States Patent and Trademark Office*